United States Patent
Bolz et al.

(10) Patent No.: US 7,210,296 B2
(45) Date of Patent: May 1, 2007

(54) METHOD AND DEVICE FOR CONTROLLING AN ELECTRICALLY DRIVEN CHARGER

(75) Inventors: Martin-Peter Bolz, Buehl (DE); Michael Baeuerle, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/478,246

(22) PCT Filed: Jan. 19, 2002

(86) PCT No.: PCT/DE02/00306

§ 371 (c)(1),
(2), (4) Date: May 27, 2004

(87) PCT Pub. No.: WO02/095204

PCT Pub. Date: Nov. 28, 2002

(65) Prior Publication Data

US 2004/0194465 A1    Oct. 7, 2004

(30) Foreign Application Priority Data

May 19, 2001    (DE)    ................................. 101 24 543

(51) Int. Cl.
*F02B 33/44*    (2006.01)
*F02B 41/10*    (2006.01)

(52) U.S. Cl. ............................. 60/608; 60/609; 60/598

(58) Field of Classification Search .................. 60/597, 60/598, 607–609; 123/564

See application file for complete search history.

(56) References Cited

U.S. PATENT DOCUMENTS

| | | | | |
|---|---|---|---|---|
| 6,029,452 | A   * | 2/2000  | Halimi et al. ................. | 60/608 |
| 6,205,787 | B1   | 3/2001  | Woollenweber et al. ....... | 60/612 |
| 6,609,375 | B2 * | 8/2003  | Allen et al. .................... | 60/608 |
| 6,688,104 | B2 * | 2/2004  | Baeuerle et al. .............. | 60/608 |
| 6,705,084 | B2 * | 3/2004  | Allen et al. .................... | 60/608 |
| 6,729,124 | B2 * | 5/2004  | Baeuerle et al. .............. | 60/285 |
| 6,880,337 | B2 * | 4/2005  | Masuda ........................ | 60/608 |
| 6,928,819 | B2 * | 8/2005  | Baeuerle et al. .............. | 60/612 |
| 2004/0194466 | A1 * | 10/2004 | Kawamura et al. ........... | 60/609 |
| 2005/0050887 | A1 * | 3/2005  | Frank et al. ................... | 60/597 |

FOREIGN PATENT DOCUMENTS

| | | | |
|---|---|---|---|
| DE | 34 11 496       |       | 4/1985 |
| DE | 197 40 968      |       | 3/1999 |
| DE | 197 57 661      |       | 3/1999 |
| DE | 199 24 274      |       | 12/1999 |
| DE | 199 05 112      |       | 8/2000 |
| EP | 0 420 704       |       | 4/1991 |
| EP | 885 353         |       | 9/1997 |
| JP | 59211720 A   *  | 11/1984 | ............. 60/609 |
| JP | 62093423 A   *  | 4/1987 | |
| JP | 2005054612 A *  | 3/2005 | |

* cited by examiner

*Primary Examiner*—Thai-Ba Trieu
(74) *Attorney, Agent, or Firm*—Kenyon & Kenyon LLP

(57) ABSTRACT

A method and a device for controlling an electrically operated supercharger are proposed, which cooperates with an exhaust-gas turbocharger for compressing the air supplied to the internal combustion engine. The controlling of the electrical supercharger (ES) is implemented via a control signal, which is generated as a function of a predefined value for the compressor-pressure ratio of the electrical supercharger.

22 Claims, 3 Drawing Sheets

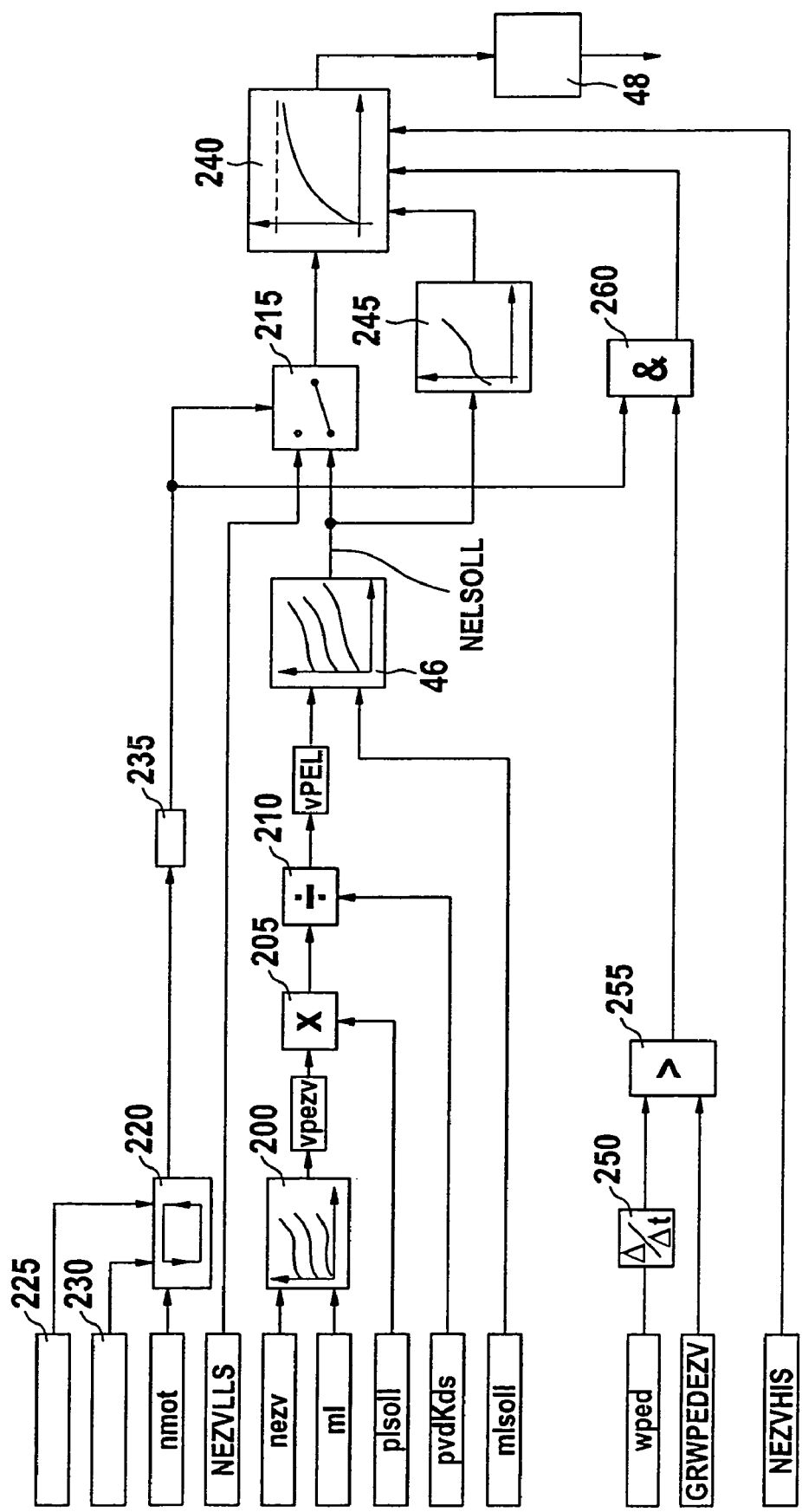

METHOD AND DEVICE FOR CONTROLLING AN ELECTRICALLY DRIVEN CHARGER

FIELD OF THE INVENTION

The present invention relates to a method and a device for controlling an electrically operated supercharger (ES).

BACKGROUND INFORMATION

The output of an internal combustion engine may be increased by compressing the air required for the combustion of the fuel with the aid of an exhaust-gas turbocharger, which is made up of a turbine and a compressor operated in the air intake of the internal combustion engine. Exhaust-gas turbochargers may have the disadvantage of a delayed and insufficient response characteristic at lower speeds of the internal combustion engine, especially in automotive drives. To improve the response characteristic of the exhaust-gas turbocharger, the exhaust-gas turbocharger may be boosted via an electrical auxiliary drive. This may be done, for example, with an electromotor integrated in the exhaust-gas turbocharger, which at low rotational speeds of the internal combustion engine assists in driving the shaft of exhaust-gas turbocharger. However, this may require not only a high loading capacity with respect to the electromotor's speed, but may also entail a high electrical power requirement due to the high inertia moments of the turbine of the exhaust-gas turbocharger.

To avoid these disadvantages, U.S. Pat. No. 6,029,452 for example, refers to running an electrically operated charge-air compressor, also referred to as electrically operated auxiliary supercharger (ES), in the air intake of the internal combustion engine, in series with a conventional exhaust-gas turbocharger. This has the advantage that the electrically operated auxiliary charger (ES) inserted separately into the air intake can be optimized to the lowest speed range of the internal combustion engine, and its power requirement may be markedly reduced due to the substantially lower moment of inertia and better efficiency.

However, it has been shown that simply turning such an electrical turbocharger or electrical auxiliary supercharger (ES) on or off may lead to fluctuations in the boost-pressure supply, accompanied by a corresponding irregular torque of the internal combustion engine. Another negative consequence of an on and off operation of such an electrical supercharger (ES) is that a high load may be placed on the vehicle electrical system.

The German patent reference DE-A 197 40 968 refers to ascertaining a setpoint value for the air-mass flow in the intake manifold as a function of driver command. The European patent reference EP 885 353 B1 refers to determining a setpoint throttle valve angle and a setpoint boost pressure value on the basis of the setpoint charge derived from the driver command.

SUMMARY OF THE INVENTION

Controlling or regulating the electrical supercharger or the electrical auxiliary supercharger (ES) as a function of demand has the advantage that it avoids fluctuations in the boost-pressure supply, and thus fluctuations in the torque of the internal combustion engine, thereby considerably improving driving comfort. This advantage may be enhanced by a continuous control of the supercharger (by continuously variable setpoint values, for example).

Another advantage of the control or regulation as a function of demand is that it may reduce the load on the vehicle electrical system.

The control or regulation as a function of demand may also be installed in existing engine control units without basic functional modification of the boost-pressure regulation.

It may be particularly advantageous to determine demand by an intervention of the electrical supercharger (ES) as a function of performance quantities of the vehicle and/or the engine, such as the ambient pressure or the setpoint boost pressure value requested by the driver, thereby implementing a precise control or regulation as a function of demand.

In an especially advantageous manner, the demand-based control or regulation of the supercharger may avoid unnecessary or excessive interventions by the supercharger.

BRIEF DESCRIPTION OF THE DRAWINGS

FIG. 3 shows third exemplary embodiment.

DETAILED DESCRIPTION

Figure 1:
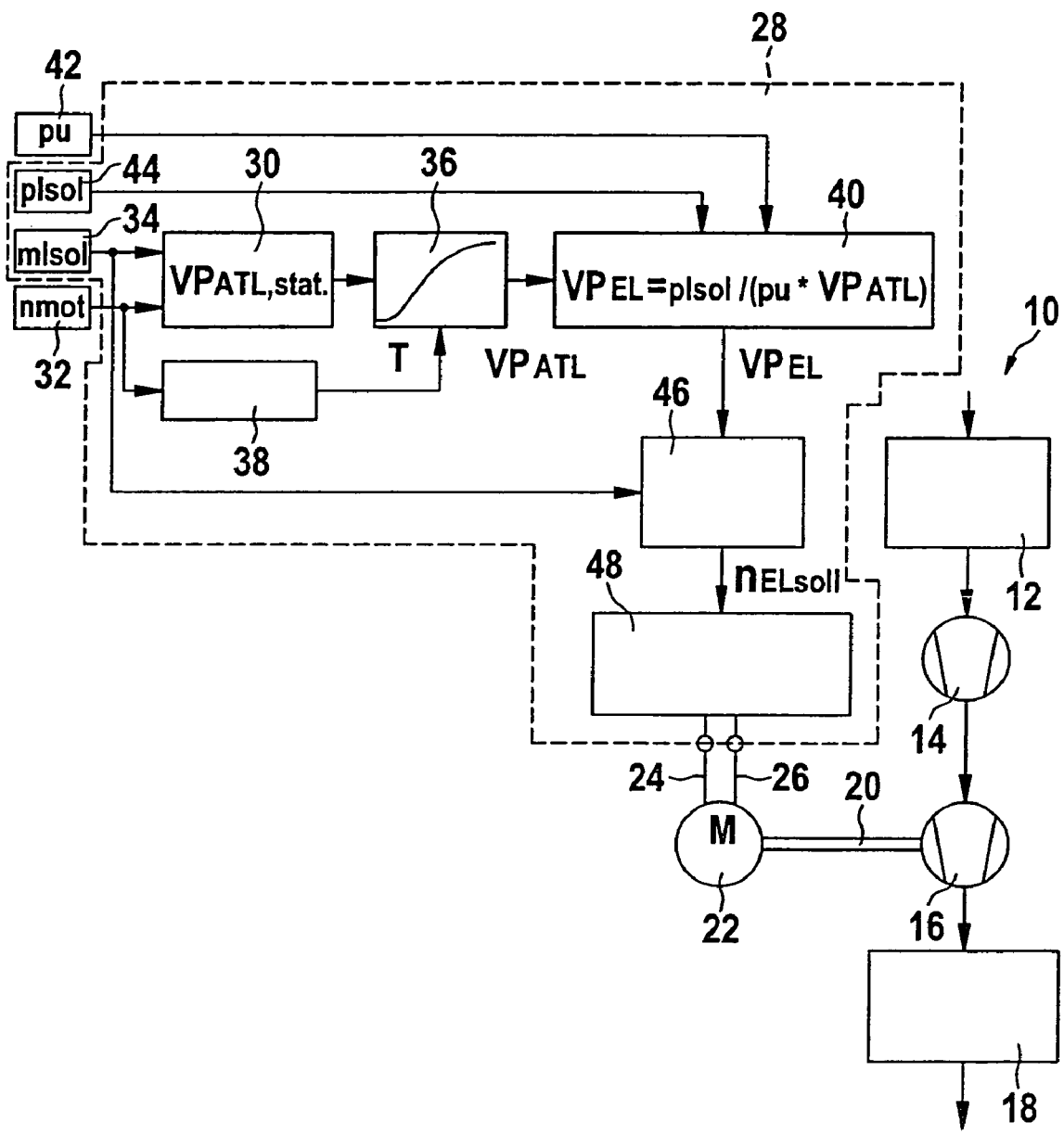
FIG. 1 shows an overall block diagram with a flow chart, which describes a first exemplary embodiment.

FIG. 1 shows a schematic block diagram including a flow chart for the control or regulation of an electrical auxiliary supercharger (ES) as a function of demand. Schematically shown in FIG. 1 is air-intake system 10 of an internal combustion engine. The aspirated air is conveyed, among others, via an air filter 12, the compressor of an exhaust-gas turbocharger 14 and electrical auxiliary supercharger 16, to charge-air cooler 18 and from there to the internal combustion engine via the throttle valve. The electrical auxiliary supercharger (ES) is actuated via a drive shaft 20 by an electromotor 22, such as a direct-current motor, which is activated by an electronic control unit 28 via control lines 24 and 26.

Electronic control unit 28 includes at least one microcomputer in which programs are implemented that implement the control of the internal combustion engine and the electrical auxiliary supercharger (ES). An exemplary embodiment for a program for controlling the electrical auxiliary supercharger (ES) is shown in FIG. 1 in the form of a flow chart as part of control unit 28. The blocks used here represent programs, program parts or program steps of such a program, while the connection arrows represent the flow of information.

In an available manner, and therefore not explicitly shown in FIG. 1, a boost-pressure setpoint value (plsoll) and an air mass setpoint value (mlsoll) are ascertained as a function of load, rotational speed and a plurality of other parameters, such as temperature, altitude, knocking condition etc. Specific approaches to determine these variables are referred to in the Background Information section. The boost pressure setpoint value is used to regulate the boost pressure in combination with a boost-pressure actual value for controlling the exhaust-gas turbocharger in a closed loop control circuit. The boost pressure actual value may be measured (pressure sensor in the flow direction in front of the throttle valve), but it may also be modeled. The air mass setpoint value is processed further in order to adjust the throttle valve, among others (forming the setpoint charge value, for example).

Therefore, the boost pressure actual value utilized in this context represents the pressure in front of the throttle valve, i.e., it includes both the effect of the compressor of the exhaust-gas turbocharger and also that of the electrical auxiliary supercharger (ES). However, to control the electrical auxiliary supercharger (ES) as a function of demand, separate data regarding the contribution of the exhaust-gas turbocharger for the compression is required, such as the actual pressure ratio above the compressor of the exhaust-gas turbocharger, which is determined as a function of the ambient pressure, or the pressure at the intake of one of the two superchargers in the flow direction, and/or the exhaust-gas temperature. Therefore, the pressure ratio to be set by the electrical auxiliary supercharger (ES) is determined as described in the following. The rotational speed of the electrical auxiliary supercharger (ES) will then be calculated as a function of this setpoint pressure ratio and set, for example, via an electronic speed regulation of the auxiliary supercharger (ES) or by a control. This ensures a precise activation of the electrical auxiliary supercharger as a function of demand, without unnecessary loading of the vehicle electrical system, without the danger of an unnecessary or excessive intervention by the auxiliary supercharger and without extra effort with respect to the utilized sensory system. Instead of a speed regulation or instead of a control of the electromotor, in another exemplary embodiment it is the compressor pressure ratio of the electrical auxiliary supercharger itself that is regulated if an additional pressure sensor is used in front of the electrical auxiliary supercharger, the compression ratio to be set being the setpoint value, and the compression ratio that is determined from the additional pressure sensor and the boost-pressure sensor being the actual value of a closed-loop control circuit.

The flow program of FIG. 1 is shown as part of control unit 28 shows a first exemplary embodiment of a procedure for determining the compression ratio to be set. To this end, the static, maximally available compressor pressure ratio of the exhaust-gas supercharger in this operating state is ascertained in a first characteristics map 30 as a function of engine speed nmot, which is detected by an appropriate measuring device 32, and the setpoint air-mass flow, which is determined in 34 as a function of driver command and additional performance quantities, for example, according to the approach referred to in the introduction. The characteristics map is applied for each engine type, for instance to a test stand. The compressor pressure ratio VPATLstat of the exhaust-gas turbocharger is then supplied to a filter 36, which may be an at least second-order low-pass filter, which simulates the time characteristic of the exhaust-gas turbocharger and thus determines the actual, maximally available compressor-pressure ratio of exhaust-gas turbocharger VPATL from the static, maximum compressor pressure ratio of the exhaust-gas turbocharger. The time constant, or the time constants, of filter 36 are read out from a characteristic curve 38 as a function of the engine speed, smaller time constants, and thus a reduced filtering action, being produced with increasing engine speed.

Instead of a setpoint value for the air-mass flow, other embodiments may use the measured value for the air-mass flow to form the compression ratio upstream from the exhaust-gas turbocharger. In this case, the result then is the actually attained compression ratio and not the attainable compression ratio as above. Also suitable instead of the air mass values are the corresponding intake manifold pressure values or charge values (cylinder charge).

It may be essential then that the overall boost-pressure ratio, i.e., the product of the compressor pressure ratio of the exhaust-gas turbocharger and of the electrical auxiliary supercharger (ES), is equal to the quotient from a boost-pressure value to an ambient pressure value. Therefore, the compressor pressure ratio of the electrical auxiliary supercharger (ES) according to 40 is determined on the basis of the context derived from this marginal condition, according to which the compressor pressure ratio VPEL of the electrical auxiliary supercharger (ES) is determined from the quotient of the setpoint pressure and the product of the ambient pressure and the compressor ratio of the exhaust-gas supercharger. Instead of the ambient pressure, the pressure at the intake of the first of the two superchargers in the flow direction may also be used.

The ambient pressure may be ascertained by a measuring device 42, while a setpoint boost pressure is used as boost pressure value, the setpoint charge pressure being determined according to 44, for example, within the framework of the approach mentioned in the beginning, as a function of driver command.

The compressor pressure ratio of the electrical auxiliary supercharger, VPEL, formed in 40 thus represents a setpoint value for the compressor pressure ratio. It is supplied to another characteristics map 46, which represents the compressor characteristic map of the electrical auxiliary supercharger (ES). In this characteristics map, likewise determined by test-stand measurements, for example, the setpoint speed NELSOLL of the auxiliary supercharger (ES) is determined as a function of the setpoint pressure ratio of the electrical auxiliary supercharger. This is implemented as a function of the setpoint compressor pressure ratio of the electrical auxiliary supercharger (ES), calculated as shown above, and the air-mass setpoint flow mlsoll as a function of driver command. The setpoint speed is determined on the basis of these variables and supplied to a speed regulation 48. Speed regulation 48 then generates control signals for motor 22 based on the setpoint speed and an actual speed (ascertained, for example, by measuring the flow through the motor), the motor thereupon rotating at the predefined setpoint speed.

In another exemplary embodiment, setpoint speed NELSOLL and/or the actual speed of motor 22 is restricted, so that a predefined electrical-system voltage of the vehicle is not undershot. This means that, when the measured voltage of the vehicle electrical system falls below a predefined limiting value, a further increase in the setpoint speed or the actual speed is prevented by restricting the corresponding value.

In addition, as protection against overheating of the motor of the electrical supercharger (ES), the ON duration of the electrical supercharger is limited to a maximum value. Once this maximum time has elapsed, the electrical auxiliary supercharger is shut off again when it reaches the shut-off instant. In an exemplary embodiment, the shut-off is implemented as ramp-shaped speed regulation having a predefined slope, i.e., the setpoint speed is reduced at a predefined gradient, up to the zero value. In one exemplary embodiment, the aforementioned maximum duration is a function of performance quantities, in particular of the external temperature and/or the motor temperature of the electrical auxiliary supercharger and/or the charge balance of the battery and/or the vehicle electrical-system voltage. In this context, the maximum value is smaller the higher the temperature, the less optimal the charge balance or the lower the vehicle electrical-system voltage.

Figure 2:
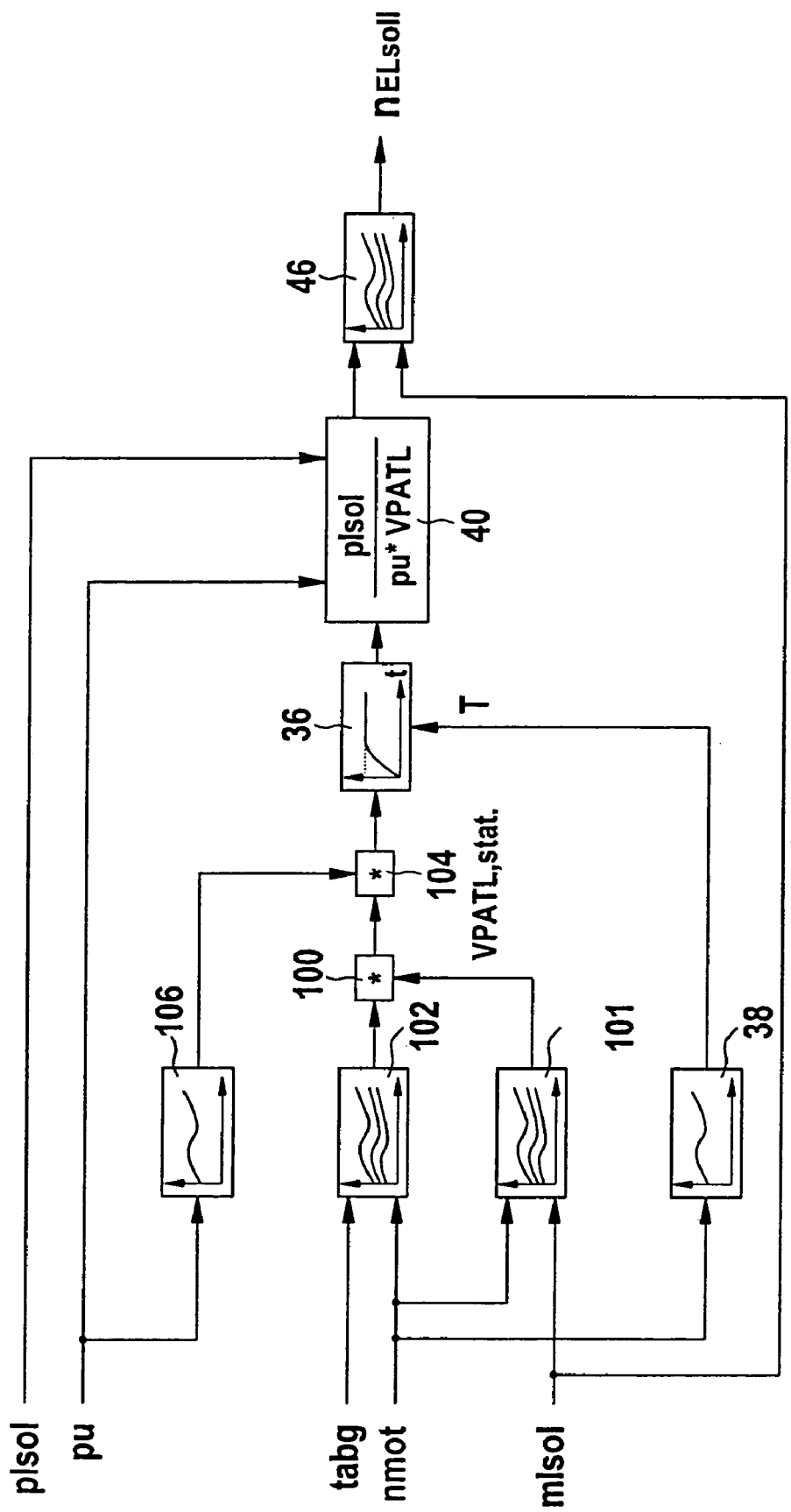
FIG. 2 shows a second exemplary embodiment.

An additional exemplary embodiment represents the flow chart shown in FIG. 2. This flow chart, too, describes the program of a microcomputer of control unit 28, the various blocks representing programs, program parts or program steps, and the connecting lines representing the flow of information. The elements already mentioned in connection with FIG. 1 bear the same reference numerals in FIG. 2 and assume the same function.

The essential difference between the procedures of FIG. 1 and FIG. 2 is that the embodiment of FIG. 2 uses variables as a function of ambient pressure Pu and exhaust-gas temperature TABG to determine the compressor pressure ratio of the exhaust-gas turbocharger. In the procedure of FIG. 2, the statically attainable value of the compressor pressure ratio VPATLSTATT is first formed in characteristics map 102 as a function of the exhaust-gas temperature TABG, this being detected with the aid of a sensor, for instance, or a computation model, and as a function of engine speed nmot. Characteristics map 102 is also determined from test-stand measurements, for example. The static value is then corrected in multiplication point 100, using a correction value, which is formed in characteristics map 101 as a function of the engine temperature and setpoint air mass flow MLSOLL. The reason for this correction is to be seen in the coupling of the exhaust-gas turbocharger and the electrical auxiliary supercharger whose effects mutually influence each other. The corrected static value of the compressor ratio of the exhaust-gas turbocharger is corrected in a further multiplying stage 104 as a function of an additional correction value. The latter is formed by characteristic curve 106 as a function of ambient pressure pu. Characteristic curve 106 is also ascertained within the framework of the application. As described on the basis of FIG. 1, the value of the static compressor pressure ratio of the exhaust-gas turbocharger corrected in this manner is converted into an actual value by filter 36 and into a setpoint value for the compressor pressure ratio of the electrical auxiliary supercharger (ES) by the conversion in step 40. Via characteristics map 46, the latter is then converted into the setpoint speed, which is set according to the representation on the basis of FIG. 1.

The flow chart shown in FIG. 3 represents an additional exemplary embodiment. This flow chart, too, describes the program of a microcomputer of control unit 28, the various blocks representing programs, program parts or program steps and the connecting lines representing the flow of information.

In FIG. 3, 200 denotes a characteristics map for determining an actual compressor pressure ratio vpezv of the electrical supercharger or electrical auxiliary supercharger 16 as a function of an actual speed nezv of electrical supercharger 16 and an air mass actual value ml, or an actual value for the air flow to the internal combustion engine. In a multiplication element 205, the actual compressor pressure ratio vpezv is multiplied by boost pressure setpoint value plsoll, which is determined in the described manner as a function of load, engine speed and a multitude of other parameters, such as temperature, altitude or ambient pressure pu, knocking condition etc. Next, in a division member 210, product vpezv*plsoll is divided by a boost pressure actual value pvdkds. The boost pressure actual value pvdkds is measured in the flow direction downstream from electrical supercharger 16 and exhaust-gas turbocharger 14 or upstream from the throttle valve, using a pressure sensor, but it may also be modeled. At the output of division member 210, setpoint value VPEL then results for the compressor pressure ratio of electrical supercharger 16. Thus, it holds:

$$VPEL = vpezv*plsoll/pvdkds \quad (1)$$

The correlation (1) may be derived from the following relationship described in connection with the exemplary embodiment according to FIG. 1:

$$VPEL = plsoll/(pu*VPATL) \quad (2)$$

When the input pressure of exhaust-gas turbocharger 14 is in satisfactory proximity to ambient pressure pu, the output pressure, to be set, of the exhaust-gas turbocharger is the product of ambient pressure pu and actual, maximally available compressor pressure ratio VPATL of exhaust-gas turbocharger 14, i.e., pu*VPATL. This is then the actual, maximally available input pressure at electrical supercharger 16. Instead of ambient pressure pu, it is also possible to use a modeled or measured pressure at the output of air filter 12. By actual compressor pressure ratio vpezv of electrical supercharger 16, charge-pressure actual value pvdkds then results at the output of electrical supercharger 16 as $$pvdkds = pu*VAPATL*vpezv \quad (3).$$

The correlation (3), which is solved for VPATL and inserted in correlation (2), results in correlation (1).

From this it follows that, according to the exemplary embodiment of FIG. 3, data regarding only the contribution of exhaust-gas turbocharger 14 for compression is not required for the control of electrical supercharger 16 as a function of demand, provided the actual compressor-pressure ratio vpezv and boost-pressure actual value pvdkds are available as measured quantities in the manner described.

Compared to the embodiment according to FIG. 1, this results in reduced computing effort, lower application cost, a faster response characteristic of electrical supercharger 16 and improved driving comfort, since the actual speed nezv of electrical supercharger 16 is used as described to ascertain the compressor pressure ratio, to be set, of electrical supercharger 16. Actual speed nezv is known in electronic control unit 28 by the appropriate measured value being read in, speed regulation 48 providing actual speed nezv of electric supercharger 16 without additional effort.

The compressor-pressure ratio VPEL, to be set, of electrical supercharger 16, available subsequent to division member 210, thus represents a setpoint value for the compressor-pressure ratio, just as it did in the specific embodiment according to FIG. 1. As described in FIG. 1, the setpoint value is provided to the additional characteristics map 46, which represents the compressor characteristics map of electrical auxiliary supercharger 16. In this characteristics map, which is likewise determined by test stand measurements, for example, setpoint speed NELSOLL of electrical supercharger 16 is determined as a function of the setpoint compressor ratio of electrical supercharger 16. This is implemented as a function of the compressor pressure ratio VPEL, to be set and calculated as above, of electrical supercharger 16 and setpoint air-mass flow mlsoll as a function of driver command. Setpoint speed NELSOLL is determined as the setpoint speed value on the basis of these variables and supplied to speed regulation 48. Speed regulation 48, on the basis of setpoint speed NELSOLL and an actual speed, which may be ascertained, for example, by measuring the flow through motor 22 of electrical supercharger 16, then generates trigger signals for motor 22 of electrical supercharger 16, which thereupon rotates at the predefined setpoint speed NELSOLL.

Characteristics map 200 for determining the actual compressor pressure ratio vpezv of electrical supercharger 16 is the inverse of compressor characteristic map 46 with respect to the input and output variables, engine speed 22 of electrical supercharger 16 and the compressor pressure ratio of electrical supercharger 16.

As an option, it may be provided in general, that is, also for each of the three exemplary embodiments described above, that a switch 215 is included as shown in FIG. 3, via which, depending on the switch position, either setpoint speed NELSOLL or a static speed NEZVLLS is selected as setpoint speed value to be forwarded to speed regulation 48.

Static speed NEZLLS may also be activated first in response to a depressed clutch.

In order to keep the load on the vehicle electrical system low and to switch in electrical supercharger 16 only as dictated by demand, it may be provided to shut off electrical supercharger 16 when engine speed nmot of the internal combustion engine, which may be embodied as combustion engine, for example, is above a first predefined engine speed 225.

In addition, and in order to prevent the constant ON and OFF operation of electrical supercharger 16, it may be provided that electrical supercharger 16 is switched on again after a shut-off once engine speed nmot of the internal combustion engine falls below a second predefined engine speed 230, which is less than the first predefined engine speed 225. In this manner, a hysteresis function may be realized, as it is denoted in FIG. 3 by reference numeral 220.

In the event that first predefined engine speed 225 is exceeded by engine speed nmot of the internal combustion engine, a bit 235 is set. If engine speed nmot of the internal combustion engine falls below second predefined engine speed 230, bit 235 is reset. If bit 235 is set, electric supercharger 16 is not required and shut off. Switch 215 is then brought into a switching position in which it supplies static speed NEZVLLS to speed regulation 48 as the setpoint speed value for electrical supercharger 16. If bit 235 is reset, electrical supercharger 16 is required and switched in. Switch 215 is then brought into a switching position in which it supplies setpoint speed NELSOLL as setpoint speed value to speed regulation 48.

As an option, it may also be provided in general, and therefore also for each of the three described exemplary embodiments, that the setpoint speed value of electrical supercharger 16 is filtered by a second filter 240, which may be designed as low pass filter, for example. This is independent of the use of switch 215. In FIG. 3 it is shown by way of example that switch 215 is followed by low pass 240, which means that low pass 240 is supplied either with static speed NEZVLLS or with setpoint speed NELSOLL as the setpoint speed value.

Low pass 240 protects speed regulation 48 from oscillations. The time constant, or the time constants, of low pass 240 may be selected as a function of setpoint speed NELSOLL, in the event that setpoint speed NELSOLL is to be provided to speed regulation 48. In the following, a single time constant of low pass 240 is to be assumed by way of example. The time constant may be selected with the aid of a characteristic curve 245 as a function of setpoint speed NELSOLL. The profile of the characteristic line may be predefined such, for example, that a smaller time constant is assigned to a lower speed NELSOLL and a larger time constant to a higher setpoint speed NELSOLL. This has the result that speed regulation 48, which follows low pass 240, is able to set a lower setpoint speed NELSOLL faster, and a higher setpoint speed NELSOLL more slowly. At higher setpoint speeds NELSOLL this does not cause an abrupt acceleration of the electric supercharger, and thus results in greater driving comfort.

Alternatively, or in addition, the time constant or the time constants, of low pass 240 may also be set as a function of parameters or controlled on the basis of characteristic fields, as a function of the air mass actual value ml and/or engine speed nezv of electrical supercharger 16, for example.

Furthermore, it may optionally be provided in general, and thus also for each of the three described exemplary embodiments, that a device 250 is included to form gradients of an accelerator-pedal position wped over time t. The gradient formed by device 250 is supplied to a comparer 255. Comparer 255 compares the gradient to a predefined value GRWPEDEZV. If the gradient is above predefined value GRWPEDEZV, a maximum speed NEZVHIS is set as the setpoint speed value for electrical supercharger 16 and supplied, either directly or via low pass 240, to speed regulation 48, as shown in FIG. 3.

In addition and as shown in FIG. 3, the forming of the setpoint-speed value, which is a function of the gradient of the accelerator-pedal position, may be linked to the aforedescribed hysteresis function. In doing so, the output of comparer 255, on the one hand, and bit 235, on the other hand, is routed to an AND-gate 260. The output of comparer 255 is set when the gradient of the accelerator-pedal position is above the predefined value GRWPEDEZV.

If the gradient of the accelerator-pedal position then lies above predefined value GRWPEDEZV and engine speed nmot of the internal combustion engine is less than the first predefined engine speed, maximum speed NEZVHIS is supplied to low pass 240 as setpoint speed value. In this manner, electrical supercharger 16 may be run up in a faster calculation grid in case of a very rapid torque requirement and an electrical supercharger 16 that is shut off or operated at low speed, thereby achieving a considerable dynamics gain.

The setpoint boost pressure plsoll is calculated via the torque structure of the motor control and requires a corresponding running time. Furthermore, the calculation method includes functions such as load-reversal damping, that lead to a delay in the generation of boost pressure setpoint value plsoll, which therefore lags with respect to the pedal signal in the form of the gradient of the accelerator position resulting from the activation of the accelerator pedal.

Alternatively, or also in addition, boost pressure setpoint value plsoll and air mass setpoint flow mlsoll may also be determined via a prediction calculation. The speed generation of electrical supercharger 16 may likewise be precontrolled or realized more rapidly by such a prediction. In calculating the prediction, it is possible, for example, to determine the difference between the last and the next to last boost pressure setpoint value and the air mass setpoint flow, and to implement an extrapolation to a subsequent boost pressure setpoint value or air mass setpoint flow on the basis of this difference, thereby realizing a prediction.

The exemplary embodiment of the present invention, described on the basis of the above exemplary embodiments, ensures a control or regulation of electrical supercharger 16, which is precise and also a function of demand, without unnecessary loading of the vehicle electrical system and without extra cost with respect to the required sensory system.

If pressure pvor in front of electrical supercharger 16 and pressure pnach behind electrical supercharger 16 in the flow direction is known, for example by measurement with the aid of one pressure sensor in front and one behind electrical supercharger 16, the actual compressor pressure ratio vpezv=pnach/pvor of electrical supercharger 16 may be determined by forming quotient pnach/pvor. In this case, based on the exemplary embodiment according to FIG. 3, the characteristics map 200 for determining the actual compressor-pressure ratio vpezv of electrical supercharger 16 may be dispensed with.

According to FIG. 1, electrical supercharger 16 is arranged downstream from exhaust-gas turbocharger 14. The order of the two superchargers 14, 16 is variable, however, as far as the regulation of the compressor-pressure ratio of electrical supercharger 16 according to th exemplary embodiment and/or method of the present invention is concerned. If, however, contrary to the illustration according to FIG. 1, electrical supercharger 16 is disposed in the flow direction in front of exhaust-gas turbocharger 14, this may be more advantageous for electrical supercharger 16 for reasons of thermodynamics.

What is claimed is:

1. A method for controlling an electrically operated supercharger that cooperates with an exhaust-gas turbocharger to compress the aspirated air of an internal combustion engine, the method comprising:
generating a control signal to control the electrical supercharger, wherein the control signal is implemented as a function of a pressure ratio to be set exclusively across the electrical supercharger.

2. A method for controlling an electrically operated supercharger that cooperates with an exhaust-gas turbocharger to compress the aspirated air of an internal combustion engine, the method comprising:
generating a control signal to control the electrical supercharger, wherein the control signal is implemented as a function of a pressure ratio to be set across the electrical supercharger;
wherein a compressor-pressure ratio of the electrical supercharger is determined as a function of a compressor-pressure ratio of the exhaust-gas turbocharger.

3. The method of claim 2, wherein the compressor-pressure ratio of the exhaust-gas turbocharger is formed as dictated by an engine speed and a predefined value for the air flow to the internal combustion engine.

4. The method of claim 2, wherein the compressor-pressure ratio of the exhaust-gas turbocharger is filtered with a filter.

5. The method of claim 4, wherein at least one time constant of the filter is a function of a performance quantity of the internal combustion engine.

6. The method of claim 2, wherein a compressor-pressure ratio, to be set, of the electrical supercharger is determined based on a compressor-pressure ratio of the exhaust-gas turbocharger, a boost pressure setpoint value, and at least one of an ambient pressure and a pressure at an intake of a first one of two superchargers in the flow direction.

7. The method of claim 6, wherein at least one of the ambient pressure and an exhaust-gas temperature are taken into account in determining a compressor-pressure ratio of the exhaust-gas turbocharger.

8. The method of claim 2, wherein the electrical supercharger is shut off above a first predefined engine speed.

9. The method of claim 8, wherein the electrical supercharger, in a shut-off state, is set to a static speed as a setpoint speed value.

10. A method for controlling an electrically operated supercharger that cooperates with an exhaust-gas turbocharger to compress the aspirated air of an internal combustion engine, the method comprising:
generating a control signal to control the electrical supercharger, wherein the control signal is implemented as a function of a pressure ratio to be set across the electrical supercharger;
wherein a compressor-pressure ratio, to be set, of the electrical supercharger is determined as a function of an actual compressor-pressure ratio of the electrical supercharger.

11. The method of claim 10, wherein the compressor-pressure ratio, to be set, of the electrical supercharger is determined as a function of a ratio between a boost pressure setpoint value and a boost pressure actual value.

12. The method of claim 10, wherein the actual compressor-pressure ratio of the electrical supercharger is formed as a function of an actual speed of the electrical supercharger and an actual value for an air flow to the internal combustion engine.

13. A method for controlling an electrically operated supercharger that cooperates with an exhaust-gas turbocharger to compress the aspirated air of an internal combustion engine, the method comprising:
generating a control signal to control the electrical supercharger, wherein the control signal is implemented as a function of a pressure ratio to be set across the electrical supercharger;
wherein a pressure in front of the supercharger is measured or modeled, the compressor-pressure ratio of the supercharger is determined therefrom and the supercharger is controlled as a function of a compressor-pressure ratio to be set and a determined compressor-pressure ratio.

14. A method for controlling an electrically operated supercharger that cooperates with an exhaust-gas turbocharger to compress the aspirated air of an internal combustion engine, the method comprising:
generating a control signal to control the electrical supercharger, wherein the control signal is implemented as a function of a pressure ratio to be set across the electrical supercharger;
wherein a compressor-pressure ratio, to be set, of the electrical supercharger is determined as a function of an accelerator-pedal gradient.

15. The method of claim 14, wherein, when the accelerator-pedal gradient exceeds a predefined value, a maximum speed is set as a setpoint speed value for the electrical supercharger.

16. The method of claim 15, wherein the setpoint speed value of the electrical supercharger is filtered with a second filter.

17. The method of claim 16, wherein at least one time constant of the second filter is selected as a function of the setpoint speed value of the electrical supercharger.

18. A method for controlling an electrically operated supercharger that cooperates with an exhaust-gas turbocharger to compress the aspirated air of an internal combustion engine, the method comprising:
generating a control signal to control the electrical supercharger, wherein the control signal is implemented as a function of a pressure ratio to be set across the electrical supercharger;
wherein a setpoint speed value is formed for the electrical supercharger as a function of a compressor-pressure ratio to be set and a predefined value for the air flow, the setpoint speed value being set with speed controller.

19. A method for controlling an electrically operated supercharger that cooperates with an exhaust-gas turbocharger to compress the aspirated air of an internal combustion engine, the method comprising:

generating a control signal to control the electrical supercharger, wherein the control signal is implemented as a function of a pressure ratio to be set across the electrical supercharger;

wherein the electrical supercharger is shut off above a first predefined engine speed; and wherein the electrical supercharger is switched on again after being shut off once a second predefined engine speed, which is less than the first predefined engine speed, is not attained.

20. A device for controlling an electrically operated supercharger, which cooperates with an exhaust-gas turbocharger to compress the air supplied to an internal combustion engine, comprising:

a control unit to generate a control signal to control the electrical supercharger, wherein the control unit includes a control-signal generating arrangement configured to set the control signal as a function of a pressure ratio to be set exclusively across the electrical supercharger.

21. A computer program, recorded on a recordable medium, executable by a processor arrangement, for controlling an electrically operated supercharger that cooperates with an exhaust-gas turbocharger to compress the aspirated air of an internal combustion engine, comprising:

program code to generate a control signal to control the electrical supercharger, wherein the control signal is implemented as a function of a pressure ratio to be set exclusively across the electrical supercharger.

22. A computer program product, which includes program code which is executable on a computer and which is stored on a computer-readable data medium, for controlling an electrically operated supercharger that cooperates with an exhaust-gas turbocharger to compress the aspirated air of an internal combustion engine, comprising:

program code to generate a control signal to control the electrical supercharger, wherein the control signal is implemented as a function of a pressure ratio to be set exclusively across the electrical supercharger.

* * * * *